Reissued Aug. 15, 1944

Re. 22,530

UNITED STATES PATENT OFFICE 22,530

PENCIL FOR LAUNDRY MARKING

Francis M. Sell, Cincinnati, Ohio, assignor to The National Marking Machine Company, Cincinnati, Ohio, a corporation of Ohio No Drawing. Original No. 2,347,644, dated May 2, 1944, Serial No. 414,159, October 8, 1941. Application for reissue June 17, 1944, Serial No. 540,790

6 Claims. (Cl. 40—1)

There are now in general use laundry marking machines which employ a laundry marking ink which is normally visible when applied to laundry articles and in which the visible ingredients are removed during a laundering operation and the remaining ingredients form a laundry mark, invisible in normal light and clearly visible on the application of ultraviolet rays in the substantial absence of visible light.

The object of my present invention is to provide means for marking and identifying articles which are to be laundered or dry cleaned, without the use of a laundry marking machine and without the use of fluid ink and pen.

More specifically, it is my object to provide a pencil formed of a somewhat rigid material which is of a highly absorbent nature, so that fluorescent ingredients may be easily incorporated therein and thoroughly distributed therethrough. This pencil is sufficiently friable so that when used for marking articles which are to be laundered or dry cleaned, a sufficient amount of the material of the pencil, together with the fluorescent ingredients dispersed therein, will adhere to the fibres of the article in sufficient quantity at least that, after the completion of a laundering or dry cleaning operation, the mark may be clearly read under the application of ultraviolet rays in the substantial absence of visible light.

The material of which the pencil is formed is preferably ordinary commercial chalk sticks such as are used on school blackboards.

I have also successfully employed one part by weight of powdered chalk and one part by weight of powdered plaster of Paris powder mixed with water and molded into suitable form.

I have also used paraffin wax and other natural and synthetic waxes.

I have also used baked clay sticks.

The fluorescent ingredient which I preferably employ is, according to the Chemical Abstracts system of nomenclature, 2-(para dimethylamino phenyl) 6-methyl benzthiazole

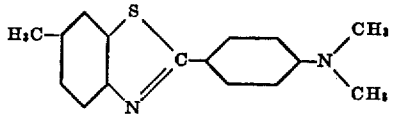

a substantially colorless compound which has the property of becoming brilliantly fluorescent when exposed to ultraviolet light, and which also possesses an affinity for textile fibres such as cotton, silk and wool. I define such compounds as colorless, fluorescent organic dyestuffs. This compound is prepared as a powder, soluble in alcohol or water.

Other colorless fluorescent organic dyestuffs which I have successfully employed are, according to the Chemical Abstracts system of nomenclature:

2-(para hydroxy phenyl) 6-methyl benzthiazole

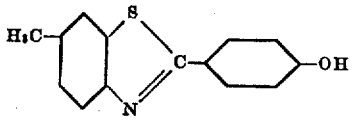

2-phenyl 5-amino benzoxazole

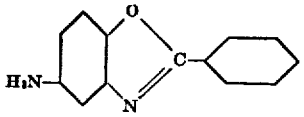

2-(para amino phenyl) 5-amino benzimidazole

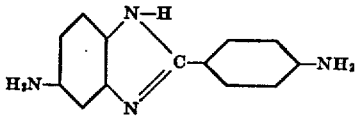

4-methyl 7-diethylamino coumarine

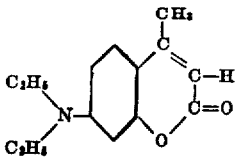

3-methyl 5-diethylamino azimidobenzene

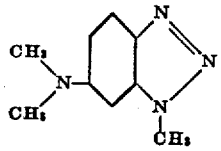

3-dimethylamino acridine

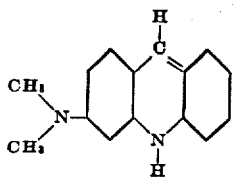

9-ethyl 3-dimethylamino carbazole

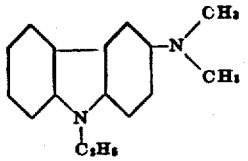

Tri (para dimethylamino phenyl) ethylene

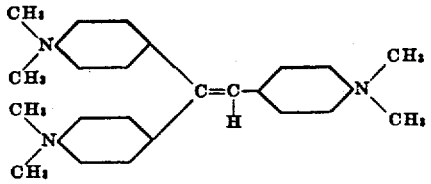

3-diethylamino phenoxazine

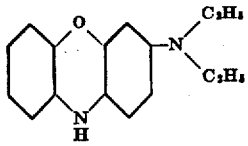

IV-IV′ diamino dibenzoyl 4-4′ diimino 2-6-2′-6′ tetrasulfonic acid stilbene

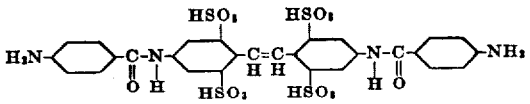

Other dyestuffs having similar characteristics may be substituted. The foregoing is simply to illustrate the compounds which I employ.

I incorporate the fluorescent ingredient in the rigid material of the pencil in the following manner: Five grams of the said thiazole dyestuff are dissoved in one hundred mls. of ethyl alcohol. The chalk sticks are immersed in the alcohol solution and the solution boiled fifteen minutes. By that time air bubbles have ceased to come from the chalk sticks, showing that the chalk is thoroughly impregnated with the solution. The solution is then allowed to cool to room temperature, and the chalk sticks taken therefrom and allowed to dry at room temperature.

I have also successfully employed the following composition: Five grams of the said thiazole dyestuffs, forty-seven and one-half grams of chalk dust, and forty-seven and one-half grams of powdered plaster of Paris, thoroughly ground together, moistened with sufficient water to form a paste, molded into suitable sticks and allowed to harden.

I have also used the following composition: Five grams of the said thiazole dyestuff are stirred in ninety-five grams of paraffin wax, heated to approximately 100° C., allowed to cool, then molded into sticks.

I have also prepared suitable pencils by immersing baked clay sticks in a solution of five grams of the said thiazole dyestuff in 100 mls. of water, boiling the solution one hour, allowing to cool at room temperature, removing the clay sticks therefrom and drying at room temperature.

I am aware that heretofore dyestuffs having the characteristics of becoming fluorescent on the application of ultraviolet rays or the like have been used to impregnate a pencil of friable material. My invention is intended primarily for use in marking textile fabrics for laundry and dry cleaning purposes, to avoid the necessity of employing marking machines, and I have successfully demonstrated that with my improved marking pencils an operator may mark upon the articles to be laundered or dry cleaned, a name or identification mark just as readily, quickly and easily as he could make the same mark on paper with a pencil.

Such prior art pencils differ from ordinary pencils primarily in that the color ingredient has the characteristics of the dyestuff as distinguished from the color ingredients of ordinary pencils, and, hence, the mark has a greater degree of firmness. Such pencils could not, however, possibly be employed for the purposes for which mine is intended, that is to say, for the purposes of the so-called invisible laundry marking. With my pencil it is essential that the rigid or friable ingredient be of an absorbent nature and that the colorless dyestuff be absorbed therein and the colorless dyestuff be characterized by being of such nature that when applied to a laundry article in the form of a pencil mark, a sufficient amount of the dyestuff ingredient would be transferred to the laundry article so that after removal of the rigid friable ingredient there will remain upon the laundry article a sufficient amount of the colorless dyestuff to be readily legible upon the application of ultraviolet rays. The said prior art pencils do not have these vital characteristics.

I have also demonstrated that marks thus made with my improved pencil will, during laundering or dry cleaning operations, have removed therefrom substantially all traces of the rigid material, that is to say, the chalk, wax, etc., and that after such laundering operation, including ironing or the dry cleaning operation there will remain in and around the fibres of the fabric a sufficient amount of the colorless fluorescent organic dyestuff so that when ultraviolet rays or the like are applied thereto in the substantial absence of visible light, the mark may be clearly seen and read.

I am not aware that heretofore any pencils have been made or used having all of the said characteristics, and it is essential in a successful laundering operation that the chalky or waxy ingredients be removable and that the fluorescent dyestuff remain in a somewhat permanent condition in and around the fibres of the fabric at the places where they were applied by the pencil.

I claim as my invention:

1. A pencil for use in normally invisible laundry marking, comprising a rigid pencil body firm enough for use as a pencil and of such degree of friability that when used for marking textile fabrics a substantial amount of the pencil will adhere to the fabric, and a colorless fluorescent dyestuff dispersed through the pencil body and having such affinity for textile fabrics that when applied thereto in the form of a mark, a substantial amount of the dyestuff will separate from the pencil body and become affixed to the fabric in the manner of a dyestuff, said pencil body ingredient being subsequently removable from the fabric without removing the dyed mark.

2. The method of laundry marking which consists in dispersing a colorless fluorescent dyestuff throughout a rigid friable pencil, then using the pencil to form a mark upon a textile fabric, and thereby applying to the fabric a substantial quantity of the pencil material and the dyestuff in the form of a mark, then subjecting the article to a laundering or cleaning operation and thereby removing from it substantially all of the pencil body and cleansing the fabric under the portions originally covered by the pencil mark, and leaving a substantial quantity of the fluorescent dyestuff affixed to the fabric in the manner of a dyestuff, and finally activating the mark to visibility by the application of ultraviolet rays or the like.

3. A pencil for use in normally invisible laundry marking, comprising a rigid pencil body firm enough for use as a pencil and of such degree of friability that when used for marking textile fabrics a substantial amount of the pencil will adhere to the fabric, and a colorless fluorescent dyestuff 2-(para dimethylamino phenyl) 6-methyl benzthiazole dispersed through the pencil body and having such affinity for textile fabric that when applied thereto in the form of a mark, a substantial amount of the dyestuff will separate from the pencil body and become affixed to the fabric in the manner of a dyestuff, and whereby the pencil ingredient may be subsequently removed from the fabric without removing the dyed mark.

4. The method of laundry marking which consists in dispersing a colorless fluorescent dyestuff 2-(paradimethylamino phenyl) 6-methyl benzthiazole throughout a rigid friable pencil, then using the pencil to form a mark upon a textile fabric, and thereby applying to the fabric a substantial quantity of the pencil material and the dyestuff in the form of a mark, then subjecting the article to a laundering or cleaning operation and thereby removing from it substantially all of the pencil body and cleansing the fabric under the portions originally covered by the pencil mark, and leaving a substantial quantity of the fluorescent dyestuff affixed to the fabric in the manner of a dyestuff, and finally activating the mark to visibility by the application of ultraviolet rays or the like.

5. A pencil for use in normally invisible laundry marking, comprising a rigid pencil body firm enough for use as a pencil and of such degree of friability that when used for marking textile fabrics a substantial amount of the pencil will adhere to the fabric, and a colorless fluorescent dyestuff 2-(para amino phenyl) 5-amino benzimidazole dispersed through the pencil body and having such affinity for textile fabrics that, when applied thereto in the form of a mark, a substantial amount of the dyestuff will separate from the pencil body and become affixed to the fabric in the manner of a dyestuff, whereby the pencil body adhering to the fabric may be subsequently removed therefrom without removing the dyed mark.

6. A pencil for use in normally invisible laundry marking, comprising a rigid pencil body firm enough for use as a pencil and of such degree of friability that, when used for marking textile fabrics, a substantial amount of the pencil will adhere to the fabric, and a colorless fluorescent dyestuff, IV—IV′ diamino dibenzoyl 4–4′ diimino 2-6-2′-6′-tetrasulfonic acid stilbene, dispersed through the pencil body and having such affinity for textile fabrics that, when applied thereto in the form of a mark, a substantial amount of the dyestuff will separate from the pencil body and become affixed to the fabric in the manner of a dyestuff, whereby the pencil body adhering to the fabric may be subsequently removed without removing the dyed mark.

FRANCIS M. SELL.

CERTIFICATE OF CORRECTION.

Reissue No. 22,530. August 15, 1944.

FRANCIS M. SELL.

It is hereby certified that error appears in the printed specification of the above numbered patent requiring correction as follows: Page 1, second column, line 19, for that portion of the formula reading "$H_3N$" read --$H_2N$--; line 38, for "diethylamino" read --dimethylamino--; and that the said Letters Patent should be read with this correction therein that the same may conform to the record of the case in the Patent Office.

Signed and sealed this 26th day of September, A. D. 1944.

Leslie Frazer (Seal) Acting Commissioner of Patents.